United States Patent Office 3,159,627
Patented Dec. 1, 1964

3,159,627
5,6,7,8-TETRAHYDROPTERIDINE DERIVATIVES
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Filed Apr. 30, 1962, Ser. No. 191,289
6 Claims. (Cl. 260—251.5)

This invention relates to novel new compounds having an aromatically substituted 5,6,7,8 - tetrahydropteridine nucleus.

The compounds of this invention have been found to have unexpectedly enhanced activity as pharmacodynamic agents specifically as diuretic or antihypertensive agents. As one skilled in the art will readily perceive these compounds will also have great use as intermediates for preparing other similar medicinal agents. The compounds also are useful as dye intermediates.

More specifically the compounds of this invention are represented by the following formula:

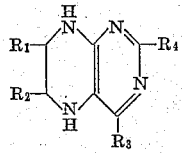

in which:

$R_1$ and $R_2$ are respectively hydrogen, loweralkyl of a maximum of 6 carbon atoms, phenyl or thienyl;
$R_3$ is diloweralkyl amino, loweralkyl amino or preferably amino; and
$R_4$ is phenyl or thienyl.

The compounds of this invention have unexpectedly been found to have few of the chemical characteristics of the parent pteridines. They are often colorless, have relatively low melting points, easily form water soluble acid addition salts and are readily soluble in many standard organic solvents. In spite of these marked differences, the compounds particularly those in which one of $R_1$ and $R_2$ is methyl and the other is hydrogen have been found to have very potent diuretic activity when administered, preferably combined with a pharmaceutical carrier, internally to animals. They have additional utility in forming easily soluble acid addition salts which can be administered parenterally.

The acid addition salts are prepared by reacting the base in a standard organic solvent such as ethyl ether, ethyl acetate, etc. with an excess of the desired acid. Exemplary of such nontoxic, pharmaceutically acceptable acids are hydrochloric, acetic, hydrobromic, sulfuric, phosphoric, sulfamic, ethanedisulfonic, maleic, citric, mandelic, pamoic, etc. acids. Usually monobasic salts are formed with the basic tetrahydropteridine compounds.

The compounds of this invention are prepared by the reduction, preferably catalytically with Raney nickel catalyst, of the corresponding pteridine compounds. A solvent, for instance methanol or ethanol, is used under catalytic hydrogenation conditions at low pressures, 50 p.s.i., at about room temperature for from about one hour to two days.

The pteridine starting materials are also a part of this invention. These compounds are prepared by reacting known 2,4-disubstituted-5,6-diaminopyrimidines with the desired glyoxal usually with a condensing agent, such as buffered sodium or potassium acetate, in a suitable solvent such as water, acetic acid, a lower alcohol or mixtures thereof. If the diaminopyrimidine is not known it is easily prepared as known to the art by reducing the known 5-nitroso-6-amino pyrimidine.

The term "lower alkyl" where used herein defines alkyl groups having up to a maximum of 6 carbon atoms. Other obvious substitutions can be made such as substitution on the aryl rings by inert substituents. The preparative methods for such compounds are obvious and such minor modifications are deemed equivalent and included in this invention. The following examples will fully illustrate how the compounds of this invention are prepared.

Example 1

A solution of 30.2 g. (0.15 mole) of 2-phenyl-4,5,6-triaminopyrimidine in 500 ml. of ethanol is mixed with 21.6 g. (0.3 mole) of pyruvaldehyde (72 g. of 30% solution) then with a solution of 29.4 g. (0.3 mole) of potassium acetate and 34 ml. (0.6 mole) of acetic acid in 100 ml. of water. Shortly a copious yellow precipitate separates. The solid product is collected and purified through acid, charcoal and base treatment; 4-amino-7-methyl-2-phenylpteridine, M.P. 269–271° C. (dec.).

Two batches of 9.3 g. (0.039 mole) of the pteridine in 250 ml. of ethanol with two teaspoonfuls of Raney nickel catalyst are hydrogenated at 50 p.s.i. and room temperature for 1½ days. The combined reaction mixtures are filtered carefully and evaporated in vacuo. The residue is taken up in dilute acetic acid. After charcoal treatment, the solution is treated with 27% ammonia to separate white crystals of 4 - amino - 5,6,7,8 - tetrahydro - 7 - methyl - 2 - phenylpteridine; M.P. 172–174° C. from ethanol.

Reacting 500 mg. of the base in ether with maleic acid gives the maleate salt using dry hydrogen chloride gas gives the hydrochloride salt.

Example 2

A hot solution of 44 g. (0.27 mole) of glyoxal bisulfite in 300 ml. of water is added to 25 g. (0.125 mole) of 2-phenyl - 4,5,6 - triaminopyrimidine in 525 ml. of water. After heating on the steam bath for one hour, the orange precipitate is separated and recrystallized from ethanol to give orange needles of 4-amino-2-phenylpteridine, M.P. 239–240° C.

Two batches of 7.3 g. (0.033 mole) of 4-amino-2-phenylpteridine in 250 ml. of ethanol with 1½ teaspoonfuls of Raney nickel is hydrogenated for 5–6 hours. The filtrate is evaporated in vacuo, taken up in dilute acetic acid and made basic with sodium hydroxide solution to give white needles of 4-amino-5,6,7,8-tetrahydro-2-phenylpteridine, M.P. 170–172° C. from ethyl acetate.

The base (1 g.) in ether is reacted with excess ethanedisulfonic acid to form the salt.

Example 3

A mixture of 36 g. of acetic acid and 29.4 g. of sodium acetate in 100 ml. of water is added to 30.2 g. of 2-phenyl - 4,5,6 - triaminopyrimidine in 500 ml. of ethanol with 86 g. of dimethylglyoxal in 50 ml. of water. The precipitate is separated, washed and recrystallized from dimethylformamide to give 4 - amino - 2 - phenyl-6,7-dimethylpteridine.

The pteridine (2.6 g.) is hydrogenated in 200 ml. of ethanol with Raney nickel for 16 hours. Working up as described above gives a residue of base which is taken up in dry ether. Hydrogen chloride gas gives yellow prisms of 4-amino-6,7-dimethyl-2-phenyl-5,6,7,8-tetrahydropteridinehydrochloride, M.P. 175–180° C.

Example 4

The following is representative of the preparation of the requisite 2 or 4-substituted-3,5-diaminopyrimidines.

Dry hydrogen chloride gas is passed into a cooled solution of 54.5 g. of 3-thiophenecarbonitrile in 75 ml. of absolute ethanol and the resulting solution is allowed to stand 48 hours. To the solid is added in several portions an 8% solution of dry ammonia in absolute ethanol containing 12 g. of ammonia. The reaction mixture is shaken for 24 hours, allowed to stand 48 hours and then filtered. The filtrate is then allowed to evaporate to dryness and the residue dissolved in water. This aqueous solution is acidified with concentrated hydrochloric acid, treated with carbon, filtered and concentrated. The crystals which form are isolated by filtration to yield 3-thiophenecarboxamidine hydrochloride.

To a solution 8.1 g. of 3-thiophenecarboxamidine hydrochloride in 80 ml. of methanol is added 11.1 g. of the silver salt of isonitrosomalononitrile. The resulting solution is stirred for 30 minutes and filtered. The filtrate is evaporated to dryness in vacuo and the residue is refluxed with 50 ml. of 5-ethyl - 2 - methylpyridine for twenty minutes. The mixture is cooled, diluted with 100 ml. of ethanol and filtered to yield 4,6-diamino-5-nitroso-2-(3-thienyl)-pyrimidine.

The 4,6 - diamino-5-nitroso-2-(3-thienyl) - pyrimidine is reduced employing sodium hydrosulfate to yield 4,5,6-triamino-2-(3-thienyl)-pyrimidine which when substituted for 4,5,6-triamino-2-phenylpyrimidine in the procedures of Example 1 yields first 4-amino-7-methyl-2-(3-thienyl)-pteridine then its tetrahydro derivative.

Example 5

Substituting in molar equivalent quantities 5,6-diamino-4-methylaminopyrimidine for its triamino congener in Example 1 gives 4-methylamino - 7 - methyl-2-phenyl-pteridine and 4-methylamino-7-methyl - 2 - phenyl-5,6,7,8-tetrahydropteridine.

Substituting 4 - dimethylaminopyrimidine gives 4 - dimethylamino-7-methyl-2-phenylpteridine and its tetrahydro congener.

6-amino-4-chloro - 2 - phenylprimidine (15 g.) is condensed with 7 g. of dibutylamine by heating as described in U.S. Pat. No. 2,963,480. The pyrimidine (10 g.) is then nitrosated as described and reduced with sodium hydrosulfate to give 5,6-diamino-2-phenyl - 4 - dibutylaminopyrimidine. This intermediate (5 g.) is condensed with dimethylglyoxal as in Example 2 to give 6,7-dimethyl-2-phenyl - 4 - dibutylaminopteridine which is reduced in ethanol with Raneyl nickel catalyst to give 6,7-dimethyl-2-phenyl-4-dibutylamino - 5,6,7,8 - tetrahydropteridine. Substituting other amines for dibutylamine other similar congeners are prepared.

Substituting 4,5,6 - triamino-2-(p-chlorophenyl)-pyrimidine, prepared by reduction of 4,6-diamino-2-(p-chlorophenyl)-4-nitrosopyrimidine (U.S. Pat. No. 2,963,480) in Example 1 gives 7-methyl-2-(p-chlorophenyl) - 2 - aminopteridine and its tetrahydro derivative. Other substituted aryl congeners are prepared similarly using starting materials disclosed in U.S. Pat No. 2,963,480.

Example 6

Substituting benzil in equimolar quantities for pyruvaldehyde in Example 1 gives 6,7-diphenyl-4-amino-2-phenyl-pteridine and 6,7-diphenyl-4-amino-2-phenyl-5,6,7,8-tetrahydropteridine. Substituting 2,2'-thenil gives the bis-α-thienyl congeners.

What is claimed is:

1. A compound selected from the group consisting of a base and its nontoxic, pharmaceutically acceptable, acid addition salts, said base being of the formula:

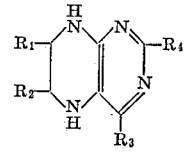

in which:

$R_1$ and $R_2$ are members selected from the group consisting of hydrogen, phenyl, thienyl and loweralkyl;

$R_3$ is a member selected from the group consisting of diloweralkylamino, loweralkylamino and amino; and $R_4$ is a member selected from the group consisting of phenyl and thienyl.

2. A compound of the formula:

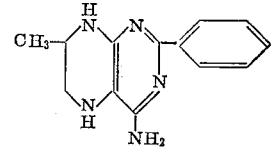

3. 4 - amino - 7 - methyl - 2 - phenyl - 5,6,7,8 - tetrahydropteridine hydrochloride.

4. 4 - amino - 7 - methyl - 2 - (3 - thienyl) - 5,6,7,8-tetrahydropteridine.

5. 4-amino-2-phenyl-5,6,7,8-tetrahydropteridine.

6 4 - amino - 6,7 - dimethyl - 2 - phenyl - 5,6,7,8 - tetrahydropteridine hydrochloride.

References Cited in the file of this patent

UNITED STATES PATENTS 2,594,271    Fahrenbach _____ Apr. 29, 1952

OTHER REFERENCES

Wolstenholme et al.: Chem and Biology of Pteridines (1954), pages 118–9.

Evans et al.: J. Chem. Soc., London (1956), pages 4106–13.

Potter et al.: J. Chem. Soc., London (1956), pages 2000–5, at 2002.

Taylor et al.: J. Org. Chem., vol 24 (1959), pages 997–9.